United States Patent
Murphy

(10) Patent No.: US 6,707,664 B2
(45) Date of Patent: Mar. 16, 2004

(54) EXPANDABLE KEYBOARD FOR PORTABLE COMPUTERS

(75) Inventor: Stephen C. Murphy, Puyallup, WA (US)

(73) Assignee: Micron Technology, Inc., Boise, ID (US)

(*) Notice: Subject to any disclaimer, the term of this patent is extended or adjusted under 35 U.S.C. 154(b) by 48 days.

(21) Appl. No.: 10/066,286

(22) Filed: Feb. 1, 2002

(65) Prior Publication Data

US 2003/0147205 A1 Aug. 7, 2003

Related U.S. Application Data

(60) Provisional application No. 60/268,143, filed on Feb. 11, 2001.

(51) Int. Cl.[7] .............................................. G06F 1/16
(52) U.S. Cl. .................. 361/680; 361/679; 361/683; 345/167; 341/22
(58) Field of Search ..................... 361/680, 681, 361/682, 683, 684, 691, 692, 693; 345/167–169, 179, 173, 163–165; 341/22, 20; 400/472, 473, 489; 340/700, 706, 710, 712; 312/208.1, 208.4; G06F 1/16, 3/02

(56) References Cited

U.S. PATENT DOCUMENTS

| | | |
|---|---|---|
| 4,600,255 A | 7/1986 | Dubarko |
| 4,709,972 A | 12/1987 | LaBudde et al. |
| 5,141,343 A | 8/1992 | Roylance et al. |
| 5,287,245 A | 2/1994 | Lucente et al. |
| 5,341,154 A * | 8/1994 | Bird .............................. 345/167 |
| 5,519,569 A | 5/1996 | Sellers |
| 5,687,058 A * | 11/1997 | Roylance ..................... 361/680 |
| 5,733,056 A * | 3/1998 | Meagher ...................... 400/472 |
| 6,111,527 A * | 8/2000 | Susel ........................... 341/22 |

FOREIGN PATENT DOCUMENTS

| | | | | |
|---|---|---|---|---|
| JP | 411102246 A | * | 4/1999 | ............. G06F/3/02 |

* cited by examiner

*Primary Examiner*—Michael Datskovskiy
(74) *Attorney, Agent, or Firm*—Knobbe, Martens, Olson & Bear, LLP

(57) ABSTRACT

An expandable keyboard with at least one keyboard sections stored in a nested manner inside a default keyboard such that the at least one keyboard sections can be extended in a telescoping manner from a housing of the default keyboard. The default keyboard comprises all the necessary keys to operate the computer so that the computer can be used even when the at least one keyboard sections is in a stored position. The expandable keyboard disclosed is particularly desirable for a portable computer in that it offers users a larger keyboard area comprising a more user friendly keypad layout yet does not add to the computer's thickness or lateral dimension so the computer remains easily portable.

28 Claims, 11 Drawing Sheets

EXPANDABLE KEYBOARD FOR PORTABLE COMPUTERS

RELATED APPLICATIONS

This application claims the benefit of U.S. Provisional Application No. 60/266,288, filed Feb. 8, 2001 which was converted to a provisional application from U.S. application Ser. No. 09/578,951 filed May 25, 2000.

BACKGROUND OF THE INVENTION

1. Field of the Invention

The invention relates to computer keyboards and more particularly to a portable computer keyboard comprising a plurality of keyboard sections that can be deployed in a telescoping manner from inside a keyboard housing.

2. Description of the Related Art

Portable computers are designed to be light and compact so that they can be easily carried and readily used in confined areas. To this end, portable computer keyboards are typically smaller in size, more compressed in layout, and designed with substantially fewer keys than the standard keyboards of desk top computers. In particular, portable computers, with limited keyboard space, have to dispense with duplicated keys that are typically afforded to standard keyboards.

A standard keyboard, for instance, comprises duplicate sets of cursor and numeric keys strategically placed on the keyboard to suit particular user preferences. One set of cursor keys is typically arranged in a tight cluster adjacent to the alphanumeric keypads, while a second set is positioned on the far right side of the keyboard wherein the keys are spaced farther apart from each other.

Similarly, a standard keyboard also comprises duplicate sets of numeric keys. In particular, one group of numeric keys is arranged in a 10-key configuration to facilitate numeric data entry, while a second identical group of keys is lined up horizontally above the alphabetical keypads so as to provide quicker access for users using the alphabetical keypads.

The duplicated keys found on standard keyboards of desk top computers are typically not available on compressed keyboards of portable computers. In fact, space constraint on portable computer keyboards often requires the cursor and numeric functions to be integrated with keys of other functions.

For example, the numeric keys on a portable computer typically are not arranged in a user friendly 10-key configuration, rather they are arranged in a row across the top of the alphabetical keys. Also, cursor keys typically are no longer positioned in a cluster conducive to easy manipulation, rather they are integrated with other function keys located across the keyboard.

One drawback of such integration is that users who are accustomed to or prefer the user-friendly keypad layout on a standard keyboard are uncomfortable using a portable computer keyboard with keys not positioned in a manner conducive to easy manipulation. A general discomfort with the keypad layout will invariably hinder the speed of the user, cause mistakes, and ultimately add to the user's frustration level. Therefore, one challenge is to design a portable computer keyboard that is compact, yet comprises duplicate cursor and numeric keys arranged in a user friendly fashion similar in layout to a standard keyboard on a typical desk top computer.

A number of keyboard configurations have been created to address this problem. One particular portable computer keyboard design, as described in U.S. Pat. No. 5,519,569, shows a sectionalized, foldable, and collapsible keyboard wherein the keyboard comprises three different sections hinged together with two end sections that can be pivoted toward the center section to conserve space when the computer is not in use. Once the two end sections are pivoted outward, the unfolded keyboard comprises all the keys of a desk top computer, including the duplicated cursor and numeric keys.

The foldable keyboard however is limiting in that both end sections must be extended for the computer to be operational. This requirement renders the computer inoperable in confined areas, such as on a crowded airplane or in a packed auditorium, where there is not enough room to fully extend the end sections. Additionally, the user must unfold both end sections to access the keyboard even if the user does not need to use the keys from the end sections.

Hence from the foregoing, it will be appreciated that there is a need for a portable computer that comprises identical keyboard layout as the standard keyboard of a typical desk top computer, wherein the keyboard does not consume additional space and provides users the flexibility of using either a compressed or expanded keyboard.

SUMMARY OF THE INVENTION

The aforementioned needs are satisfied by the computer keyboard of the present invention. In one aspect, the present invention comprises a housing having an opening formed in a first surface of the housing, a display attached to the housing and a first keyboard positioned on a second surface of the housing. Furthermore, a second keyboard is movably mounted to the housing so that the second keyboard can be moved between a storage configuration and a deployed configuration, wherein the second keyboard in the deployed configuration extends out of the opening so as to extend outward from the first surface of the housing.

In one embodiment, the first keyboard comprises a QWERTY keyboard positioned on an upper surface of the housing and wherein the opening in the housing is positioned on a side surface of the housing so that the second keyboard extends outward from the side surface. The first keyboard further comprises additional keys such as cursor, page scroll, insert/delete, and dedicated function keys so that users can fully operate the computer by using only the first keyboard.

Additionally, the second keyboard comprises duplicate sets of frequently used keys such as cursor, page scroll, insert/delete keys. The duplicated keys are arranged in a user-friendly layout similar to the keypad configurations of a standard keyboard. In confined areas, however, the user has the option of not deploying the second keyboard comprising a duplicate set of frequently used keys. For users who prefer the keypad configuration of the second keyboard, the second keyboard can be deployed anytime during usage by simply pressing a switch located on the second keyboard. Likewise, the user also has the flexibility of sliding the second keyboard back into the first housing when it is no longer needed.

This embodiment further provides a latch mechanism comprising a spring biased hook member placed inside a cavity region formed on a first inner surface of the first housing which effectively secures the second keyboard in place when it is not being used. Additionally, a plurality of drop-down leg members are formed on a bottom surface of the second keyboard so as to provide support for the second keyboard when it is deployed.

In another embodiment, the second keyboard includes a second keyboard housing having an opening in a first surface of the second keyboard housing. In this embodiment, a third keyboard comprising numeric keys arranged in a 10-key configuration is movably mounted to the second keyboard housing so as to be movable between a storage configuration and a deployed configuration wherein the third keyboard in the storage configuration is stored within the second keyboard housing and wherein the third keyboard in the deployed configuration extends out from the first surface of the second keyboard housing.

The third keyboard of this embodiment is secured inside the second keyboard housing by a similar latch mechanism as described above wherein a spring biased hook member is positioned inside a cavity region on a first inner surface of the second keyboard housing. Users who prefer numeric keys arranged in a 10-key configuration on the third keyboard have the flexibility of deploying only the third keyboard with from inside the second keyboard housing while the second keyboard is still in a stored configuration inside the first keyboard.

In this particular embodiment, the second and third keyboards are respectively mounted so that when the second and third keyboards are respectively in the storage configuration, an outer surface of the third keyboard and the outer surface of the second keyboard are co-planar with the first surface of the second keyboard housing. This effectively stream lines the outer contour of the keyboard as to minimize the consumption of lateral space.

In another aspect of the present invention, an expandable computer keyboard is provided wherein at least one keyboard section is housed in a nesting fashion within at least one keyboard member such that the at least one keyboard section telescopes out from a side surface of the first keyboard member when a latch member is released.

In one embodiment, a second keyboard section and a third keyboard section are stored respectively in a nesting fashion inside a housing of the first keyboard member wherein the first keyboard member serves as a default keyboard comprising all the necessary keys to operate every available function of the computer. The additional keyboard sections, when deployed, provide users with additional duplicated keys typically available on a standard keyboard so that the overall keyboard is almost identical to the standard keyboards of desk top computers.

An additional aspect of the invention provides a computer keyboard comprising at least one keyboard section that can be retracted back into a housing of a first keyboard section so as to reduce the size of the keyboard. In one embodiment, a second keyboard section and a third keyboard section are movably mounted to the housing so that they can be moved to inside the first keyboard housing to reduce the overall lateral dimension of the keyboard. In this particular embodiment, a plurality of latch mechanisms is used to secured the second and third keyboard sections inside the first keyboard housing. Additionally, the first key board section is operable even if the second and third keyboard sections are inside the first keyboard housing.

From the foregoing, it will be appreciated that the aspects of the present invention introduce a new expandable portable keyboard wherein additional keyboard sections can be telescoped out from a default keyboard when needed. Otherwise, the additional keyboard sections can be stored in a nesting position with only the default keyboard exposed. The default keyboard comprises a compressed keypad layout sufficient to fully operate the computer independent of other key board sections. The present invention therefore not only addresses the undesirable aspects of a compressed keyboard layout on portable computers, but also provides a portable computer with adjustable keyboard sizes so that the computer is operable even in confined areas with very limited space. These and other objects and advantages will be more fully apparent from the following description taken in conjunction with the accompanying drawings.

DETAILED DESCRIPTION OF THE ILLUSTRATED EMBODIMENTS

Reference will now be made to the drawings wherein like numerals refer to like parts through out. As will be described hereinbelow, the illustrated embodiment provides a portable computer with an expandable keyboard comprising a plurality of keyboard sections that are housed in a nesting fashion within a first keyboard section, wherein the plurality of nested keyboard sections telescope out from the first keyboard section when a latch is activated.

Figure 1:
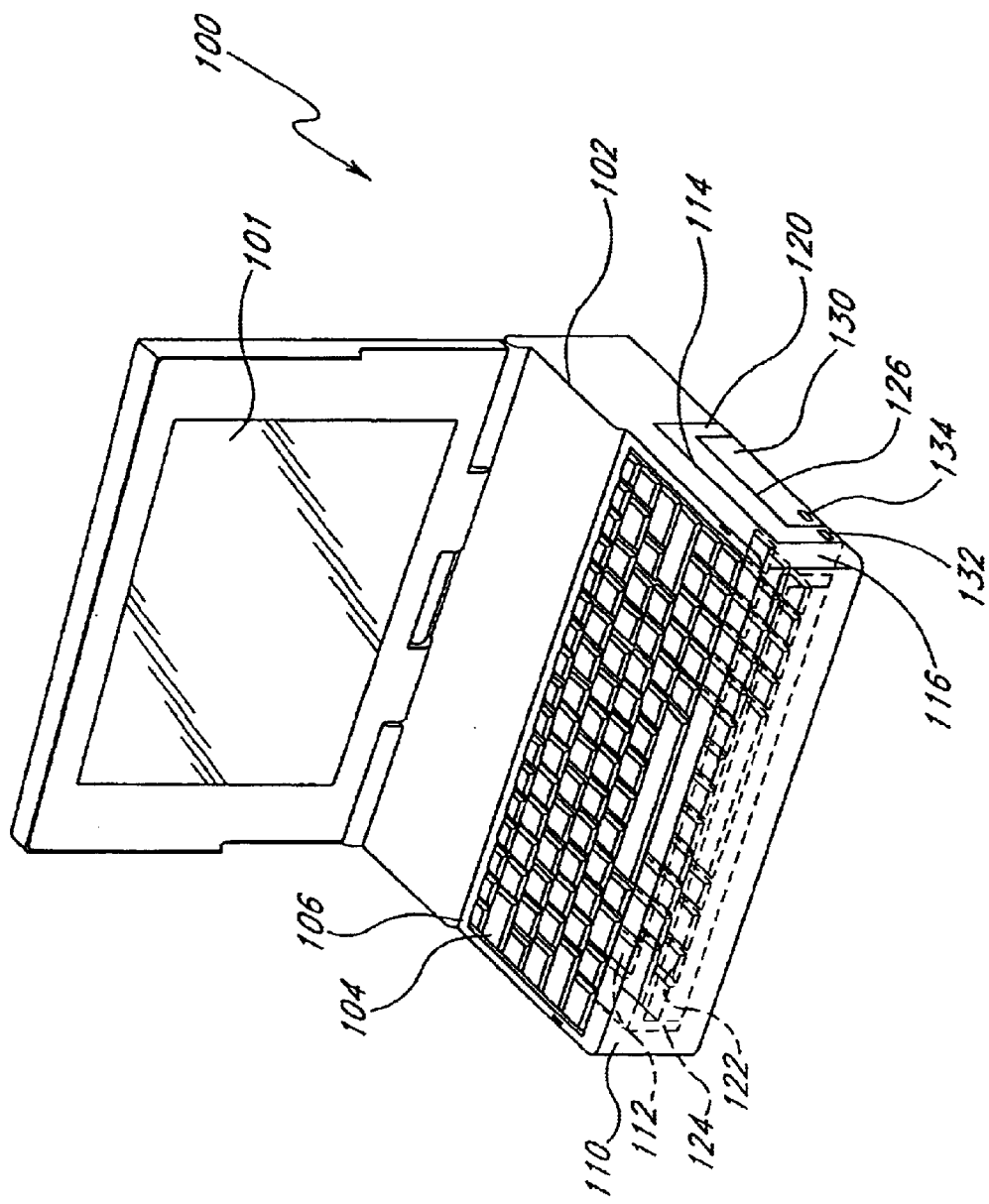
FIG. 1 is a simplified perspective view of one embodiment of a portable computer wherein additional keyboard sections are stored in a nested position inside a keyboard housing.

As is shown in FIG. 1, an exemplary portable computer 100 of the illustrated embodiment comprises a first keyboard section 102 formed in a well known manner wherein a plurality of keys 104 is positioned on a substantially horizontal top surface 106 of a first keyboard housing 110. In the preferred embodiment, the first keyboard section 102 comprises a QWERTY keyboard that is well known in the art along with additional function keys not typically available on a QWERTY keyboard, such as the cursor, page scroll, insert/delete keys, or dedicated function keys such as F1 to F10. The first keyboard section 102 in this embodiment comprises all the necessary keys to operate every available computer function and hence qualifies as a default keyboard for the portable computer 100.

One primary advantage of portable computers is the flexibility they afford to users who travel frequently or have a need for computers at locations away from home or office. Hence, a key consideration in the design of portable computers is to ensure that the computers remain light, compact, and portable. Portability is therefore a consideration in the design of the illustrated embodiment.

As FIG. 1 illustrates, a screen 101 attached to the first keyboard housing is relatively flat so as to reduce the weight and bulk of the computer. FIG. 1 further illustrates that a second keyboard section 112 is stored in a nesting manner inside the first keyboard housing 110. The second keyboard section 112 is recessed within an opening 114 on a first outer surface 116 of the first keyboard housing 110 in such a fashion that only a first outer surface 120 of a second keyboard housing 124 is exposed to view.

Moreover, a third keyboard section 122 is also stored in a similar nesting manner inside the second keyboard housing 124. In particular, the third keyboard section 122 is recessed within an opening 126 on the first outer surface 120 of the second keyboard housing 124 so that only a first outer surface 130 of the third keyboard section 122 is exposed to view.

Additionally, in the storage configuration as shown in FIG. 1, the first outer surface 120 of the second keyboard housing 124 and the first outer surface 130 of the third keyboard section 122 are coplanar with the first outer surface 116 of the first keyboard housing 110. This configuration enables the three separate keyboard sections to appear as one integral whole when they are not deployed. Such storage configuration conserves lateral space and reduces the overall size of the computer so that it is more readily portable.

Furthermore, the second keyboard section 112 is deployed when the user engages a first switch 132 that is affixed in a well known manner to the first outer surface 120 of the second keyboard housing 124. In one embodiment, the first switch 132 slides in a substantially horizontal direction to release the stored second keyboard section 112. As will be described in detail below, the deployment mechanism comprises engaging the first switch 132 that is connected in a well known manner to a spring loaded latch, so the latch will release the second keyboard section 112 from inside the first keyboard housing 110. Similarly, a second switch 134 shown in FIG. 1 is affixed to the first outer surface 130 of the third keyboard section 122, wherein the second switch 134 engages a spring loaded latch mechanism, so as to release the third keyboard section 122 from inside the second keyboard housing 124.

Figure 2:
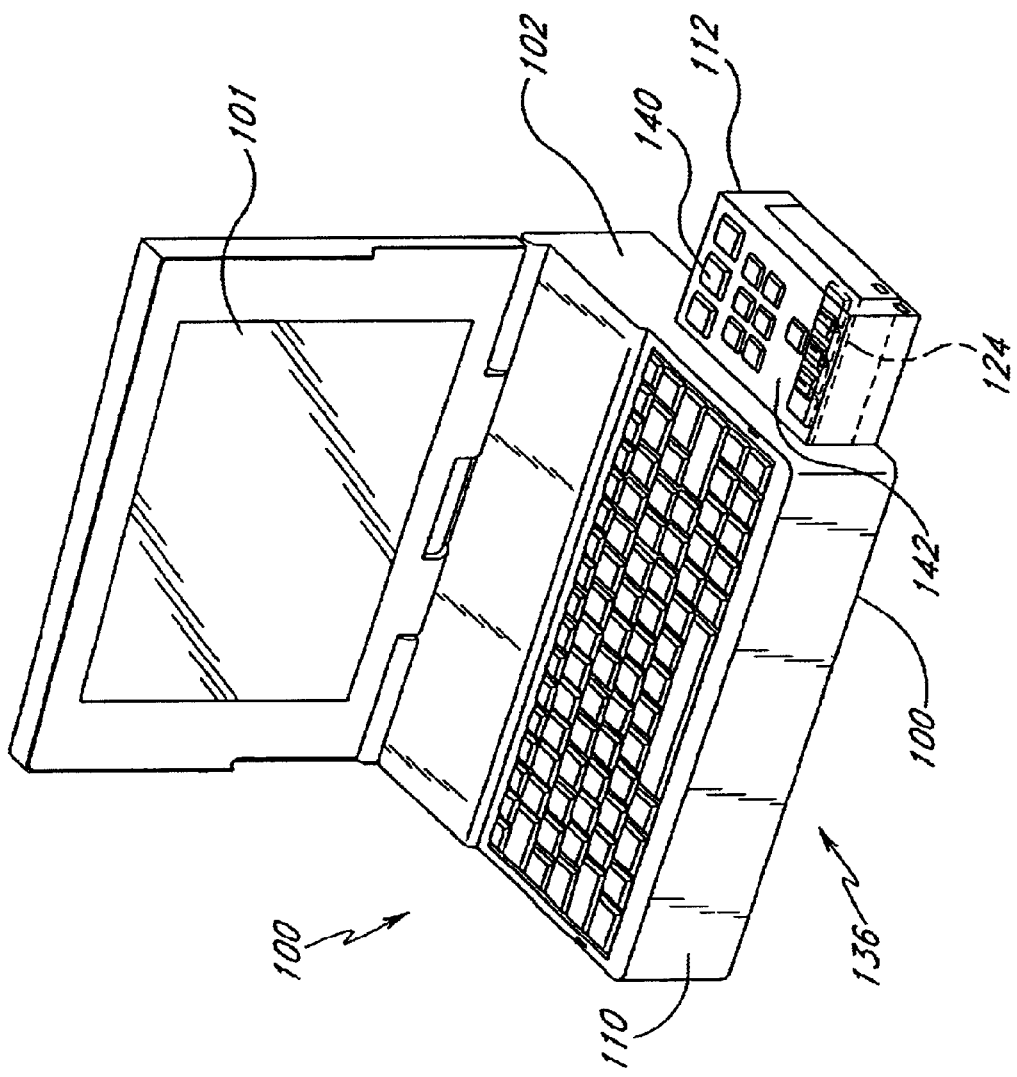
FIG. 2 is a simplified perspective view of the portable computer of FIG. 1 with an expanded keyboard wherein a second keyboard section is telescoped out from an opening on the keyboard housing.

FIG. 2 illustrates a first expanded key board 136 of the illustrated embodiment wherein the second key board section 112 formed in a well known manner is telescoped out from the first keyboard housing 110. In this embodiment, the second keyboard section 112 comprises the second keyboard housing 124 and a plurality of keys 140 positioned on a substantially horizontal top surface 142 of the second keyboard housing 124. In this embodiment, the second keyboard section 112 comprises keys to move the cursor, scroll pages, and insert or delete entries and the keys are grouped together in a user friendly fashion so as to facilitate the manipulation of keys. In particular, users who are accustomed to or prefer the cursor keypad layout on the keyboard of a typical desk top computer will now have access to the same keypad configuration on a portable computer.

The user, however, also has the option of not deploying the second keyboard section 112 when working in a confined area such as on a crowded airplane. As described above in detail, the first key board section 102 retains all the necessary keys to serve as a default keyboard so that users may choose not to deploy the stored second keyboard section 112, yet still be able to operate the computer 100 using only the first keyboard section 102.

Figure 3:
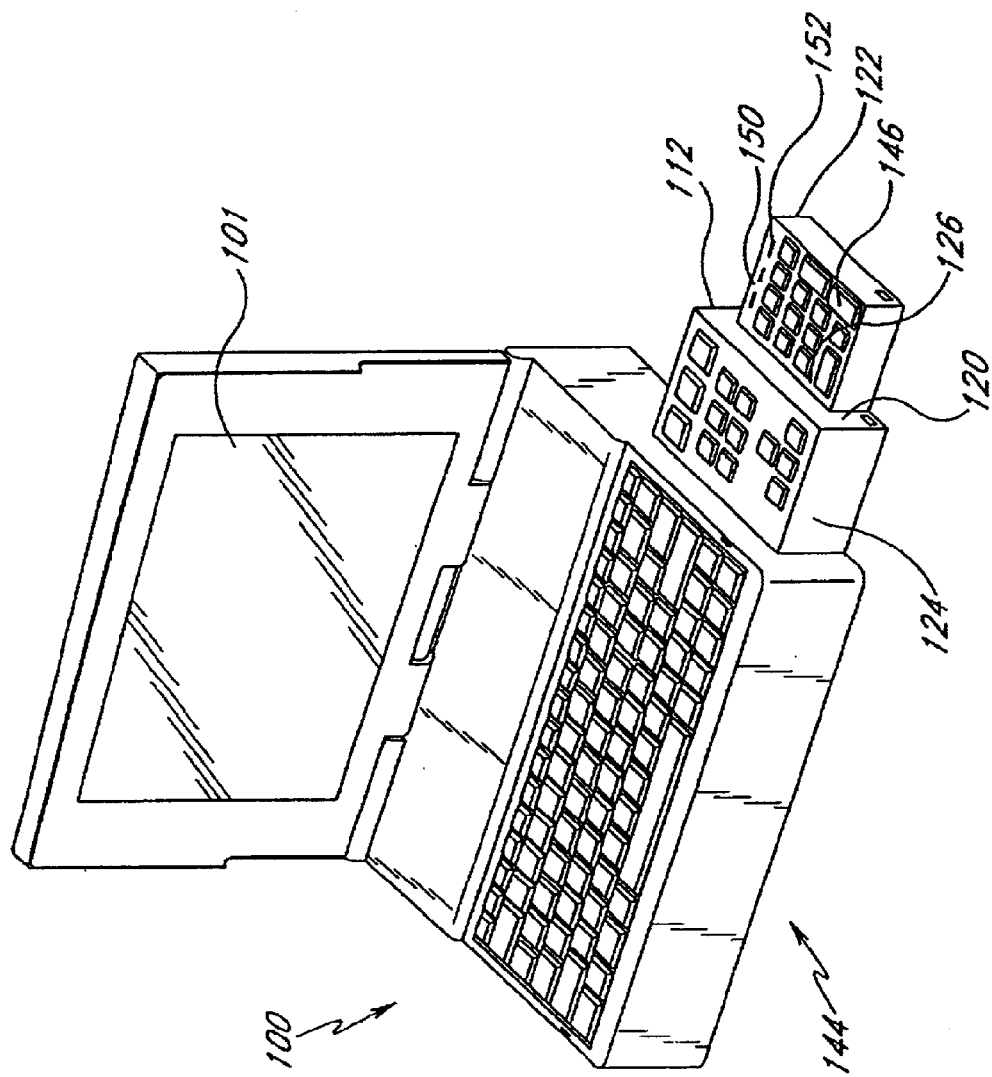
FIG. 3 is a simplified perspective view of the portable computer of FIG. 1 with a fully expanded keyboard wherein a third keyboard section is telescoped out from a housing of the already extended second keyboard section.

FIG. 3 shows a further expanded keyboard 144 made possible by telescoping out the third key board section 122 from the opening 126 on the first outer surface 120 of the second keyboard housing 124. As is illustrated in FIG. 3, the third key board section 122 formed in a well known manner comprises a plurality of keys 146 positioned on a horizontal top surface 150 of the third keyboard section 122.

In one embodiment, the third keyboard section 122 comprises numeric keys arranged in a 10-key fashion so as to facilitate arithmetic operations and number entry. In another embodiment, a plurality of LED key indicators 152 similar to those found on the keyboard of a desk top computer is also placed in a well known manner on the top surface 150 of the third keyboard section 122.

Figure 4:
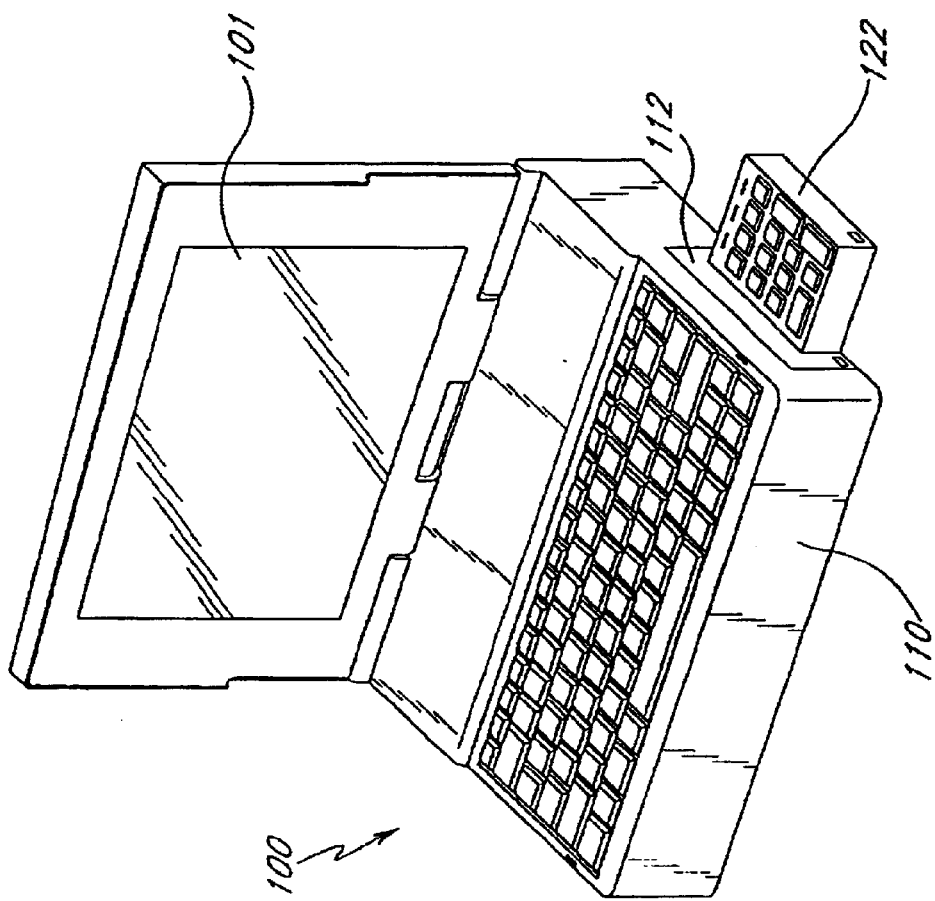
FIG. 4 is a simplified perspective view of the portable computer of FIG. 1 wherein a third keyboard section is telescoped out while the second keyboard section remains stored within the keyboard housing.

Similarly, the third keyboard section 122 can also be retracted back into the second keyboard housing 124 whenever the user works in a confined area. Additionally, if the user only needs to use the 10-key numeric keypad, the user can retract the second keyboard section 112 back into the first keyboard housing 110 while leaving only the third keyboard section 122 deployed as shown in FIG. 4.

Figure 5:
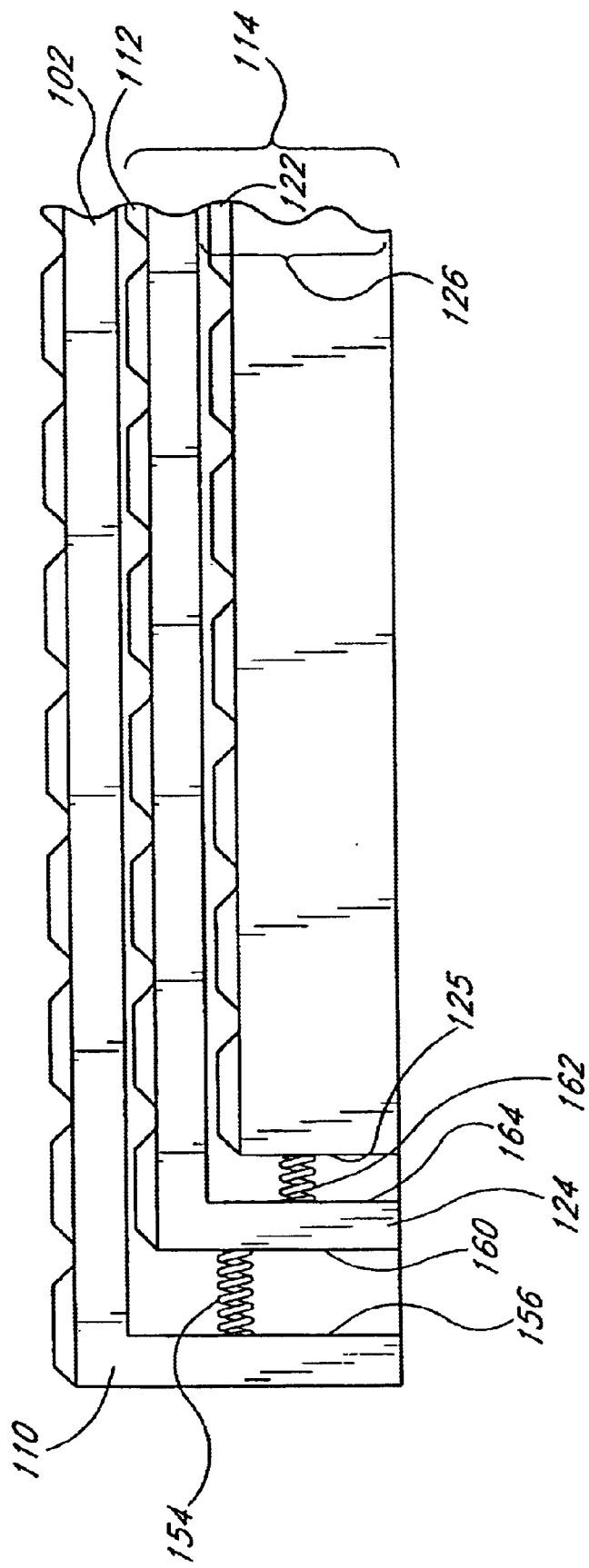
FIG. 5 is a simplified cutaway side view of one embodiment of a keyboard housing of the portable computer in FIG. 1 which illustrates two keyboard sections stored in a nested configuration therein.

FIG. 5 illustrates a simplified cutaway side view of the first keyboard section 102 wherein the second keyboard section 112 and the third keyboard section 122 are stored in a nesting fashion inside the first keyboard housing 110. As FIG. 5 further shows, a first spring 154 is mounted in a well known manner to a first inner surface 156 of the first key board housing 110 and pressed against a second outer surface 160 of the second key board housing 124. Additionally, the first spring 154 is biased in the direction towards the opening 114 of the first keyboard housing 110 so that it will uncompress and push out the second keyboard section 112 once the first switch 132 activates a latch mechanism to be described in detail below.

Furthermore, FIG. 5 shows that a second spring 162 is mounted in a well known manner to a first inner surface 164 of the second keyboard housing 124 and pressed against a second outer surface 125 of the third keyboard section 122. The second spring 162 is also biased in the direction of the opening 126 of the second keyboard housing 124 so that it will uncompress and push out the third keyboard section 122 when the second switch 134 activates a latch mechanism to be described in detail below.

Figure 6:
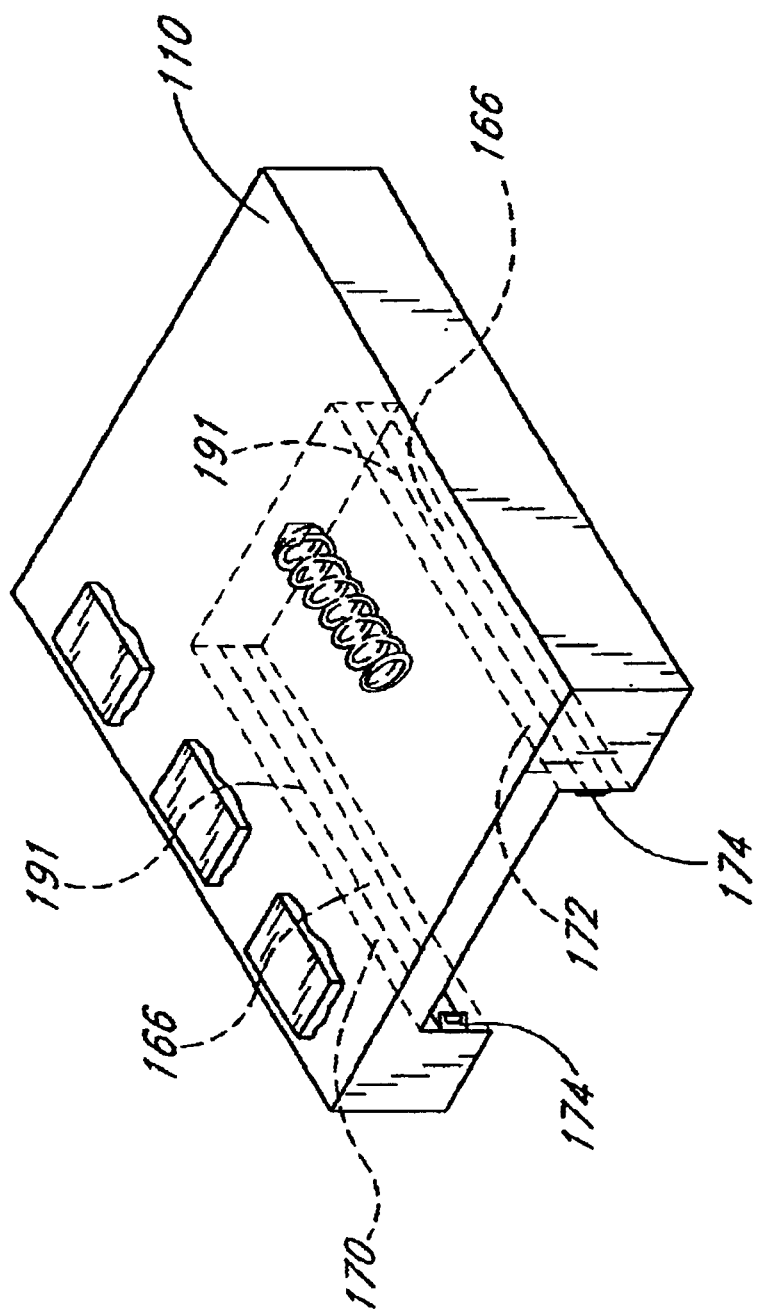
FIG. 6 is a simplified partial perspective view of the keyboard housing in FIG. 5 illustrating a plurality of channels placed along the inner side walls of the keyboard housing to facilitate the movement of the keyboard section to be stored therein.
Figure 8:
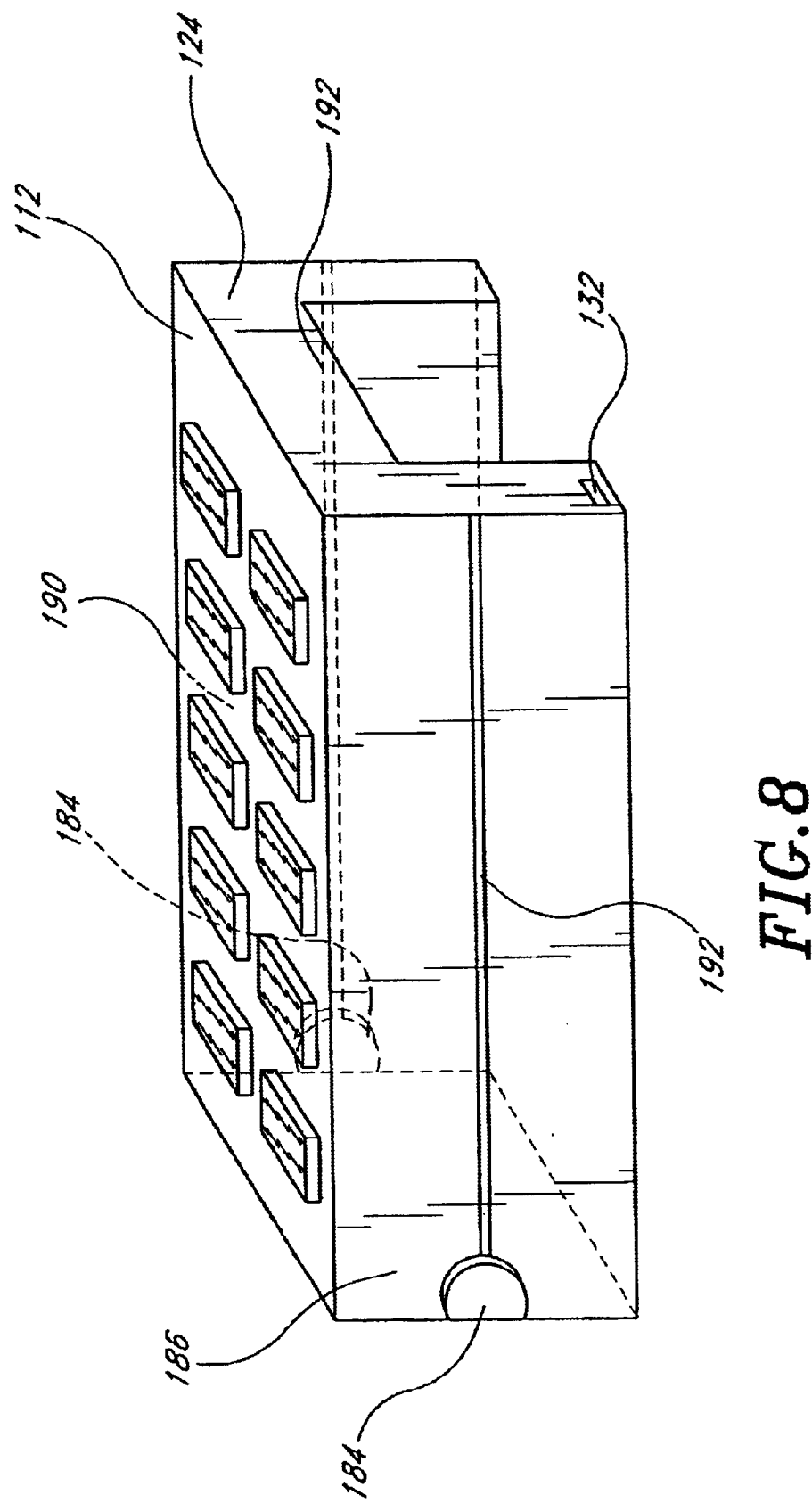
FIG. 8 is a simplified perspective side view of the second keyboard housing in FIG. 3 illustrating a plurality of channels and wheels formed along the outer side walls of the housing to facilitate its movement inside the first keyboard housing.

In the embodiment as illustrated in FIG. 6, the first keyboard housing 110 also comprises a plurality of channels 166 mounted along the second inner surface 170 and a third inner surface 172 of the first keyboard housing 110. The plurality of channels 166 serves as guide rails for the second keyboard section 112 to slide in and out of the first keyboard housing 110 wherein a plurality of wheels 184 formed on the second keyboard housing 124 as illustrated in FIG. 8 facilitates the movement of the second keyboard section 112 in a manner to be described in detail below.

In another embodiment, the plurality of channels 166 has a tilted end section wherein the tilted end section lifts the deployed second keyboard section 112 so as to raise it to the same level as the first keyboard housing 110. It is therefore easier for users to manipulate keys when the deployed second keyboard section 112 is at level with the first keyboard housing 110.

As FIG. 6 further shows, a plurality of catch mechanisms 174 is placed on the plurality of channels 166. The plurality of catch mechanisms 174 prevents the second keyboard section 112 from falling out of the first keyboard housing 110 when the second keyboard section 112 is fully extended out from the opening 126 in a well known manner. In particular, the plurality of catch mechanisms 174, as will be described in detail below, stops the second keyboard section 112 by catching the plurality of wheels 184 protruding from the second keyboard housing 124.

Figure 7:
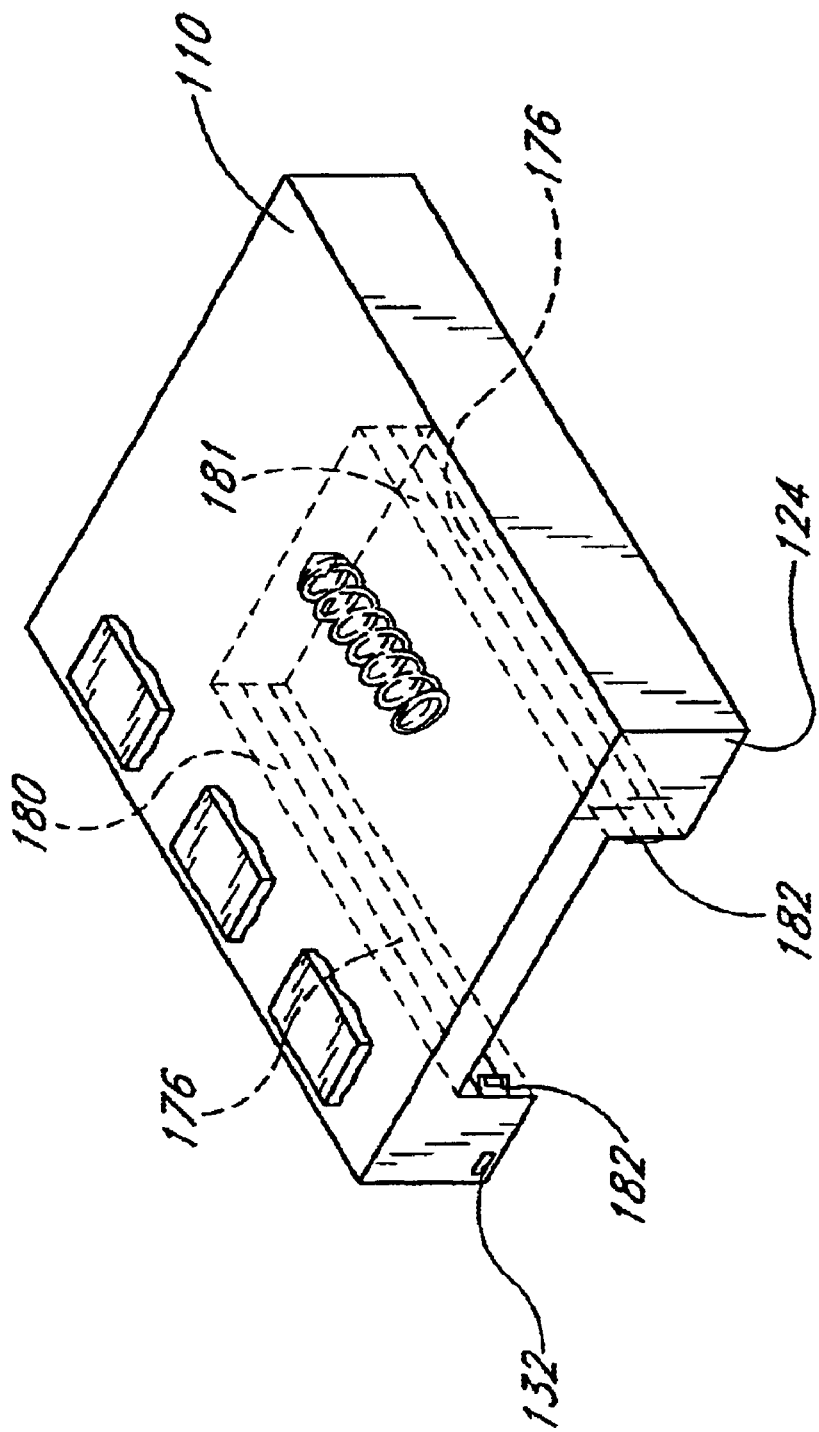
FIG. 7 is a simplified perspective sectional view of the second keyboard housing in FIG. 3 illustrating a plurality of channels placed along the inner side walls of the housing to facilitate the movement of the keyboard section to be stored therein.
Figure 9:
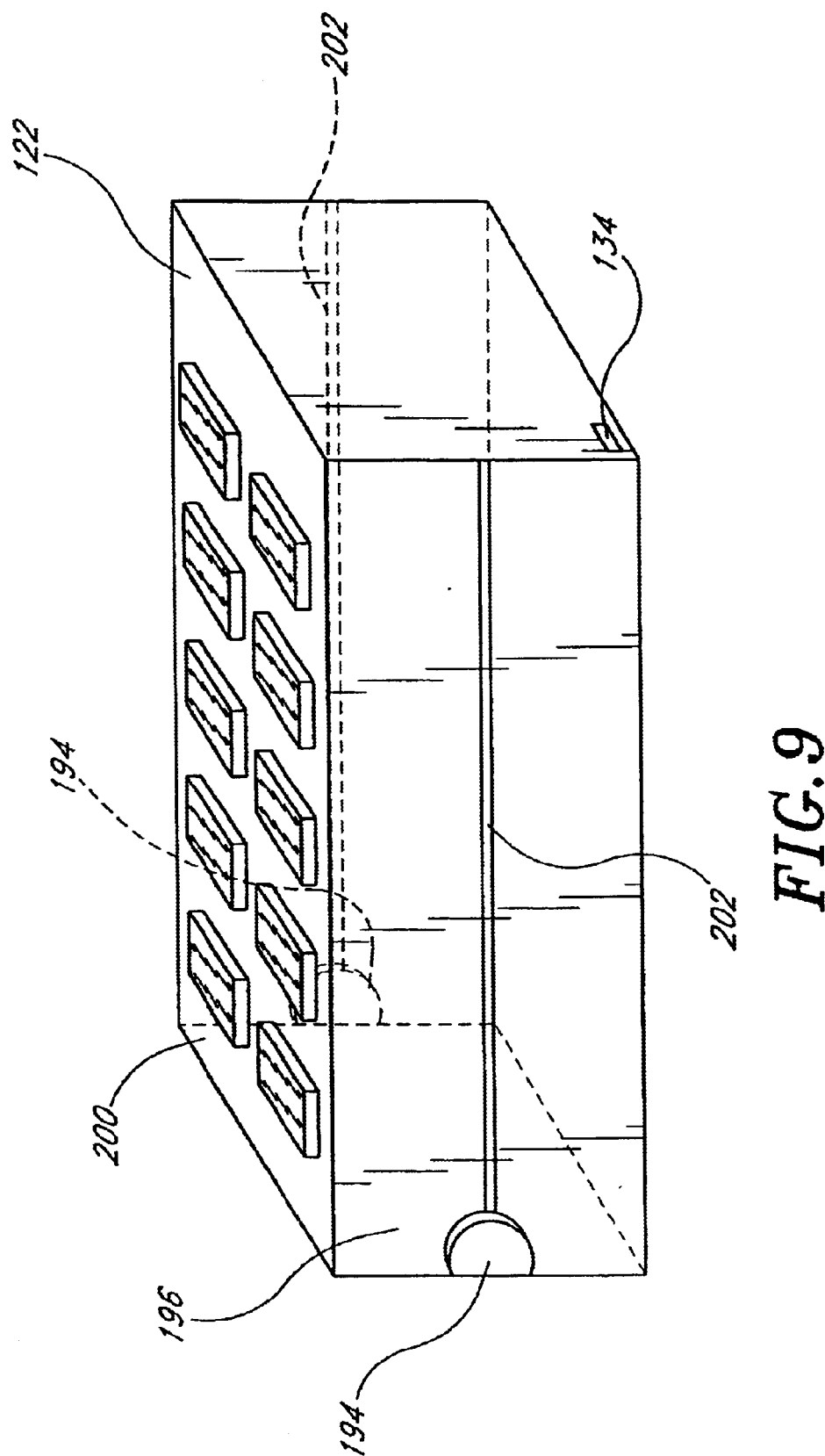
FIG. 9 is a simplified perspective side view of the third keyboard housing in FIG. 4 illustrating a plurality of channels and wheels formed along the outer surfaces of the keyboard section to facilitate its movement inside the second keyboard housing.

FIG. 7 shows the second keyboard housing 124 also comprises a plurality of channels 176 mounted along the second inner surface 180 and a third inner surface 181. A plurality of catch mechanisms 182 installed on the plurality of channels 176 prevents the third keyboard section 122, when fully deployed, from falling out of the second keyboard housing 124. The catch mechanism stops the third keyboard section 122 by catching a plurality of wheels 194 formed on the third keyboard section 122 as shown in FIG. 9 in a manner to be described in detail below.

In the illustrated embodiment, as shown in FIG. 8, the plurality of wheels 184 is affixed to a third outer surface 186 and a fourth outer surface 190 of the second keyboard housing 124 such that the plurality of wheels 184 not only facilitate movement of the second keyboard section 112 along the plurality of channels 176 as shown in FIG. 7, but also protrude out from the third outer surface 186 and the fourth outer surface 190 of the second keyboard housing 124 so that they will be caught by the plurality of catch mechanisms 174 placed near the opening 114 of the first keyboard housing 110 as shown in FIG. 6.

The plurality of catch mechanism 174 is designed to protrude from the plurality of channels 170 and will catch the plurality of wheels 184 protruding from the second keyboard housing 124 once the second keyboard housing 124 is fully deployed. The catch mechanism 174 prevents the already filly deployed second keyboard housing 124 from extending farther or falling out of the first keyboard housing 110.

FIG. 8 further shows a plurality of second channels 192 formed along the third outer surface 186 and the fourth outer surface 190 of the second keyboard section 112. The plurality of second channels 192 is designed to fit on a top surface 191 of the plurality of first channels 170 formed inside the first keyboard housing 110 so as to facilitate movement of the second keyboard section 112 inside the first keyboard housing 110.

FIG. 9 shows a third keyboard section 122 designed in a similar fashion as a plurality of wheels 194 is attached to a third outer surface 196 and a fourth outer surface 200 so as to facilitate the movement of the third keyboard section 122 along the plurality of second channels 176 inside the second keyboard housing 124. Additionally, the plurality of wheels 194 slightly protrude from the third outer surface 196 and the fourth outer surface 200 so that the catch mechanism 182 as shown in FIG. 7 will make contact with the plurality of wheels 194 to prevent the third keyboard section 122 from falling out when it is fully deployed.

FIG. 9 further shows the third keyboard section 122 comprising a plurality of third channels 202 along the third outer surface 196 and the fourth outer surface 200. The plurality of third channels 202 is formed in a well known manner so as to facilitate the movement of the third keyboard section 122 along the plurality of second channels 176 inside the second keyboard housing 124. In particular, the plurality of wheels 194 positioned near the end of the plurality of third channels 202 will slide along the plurality of second channels 202 so that the plurality of third channels will fit over the plurality of second channels so as to guide the movement of the third keyboard section 122 in and out of the second keyboard housing 124.

Figure 10:
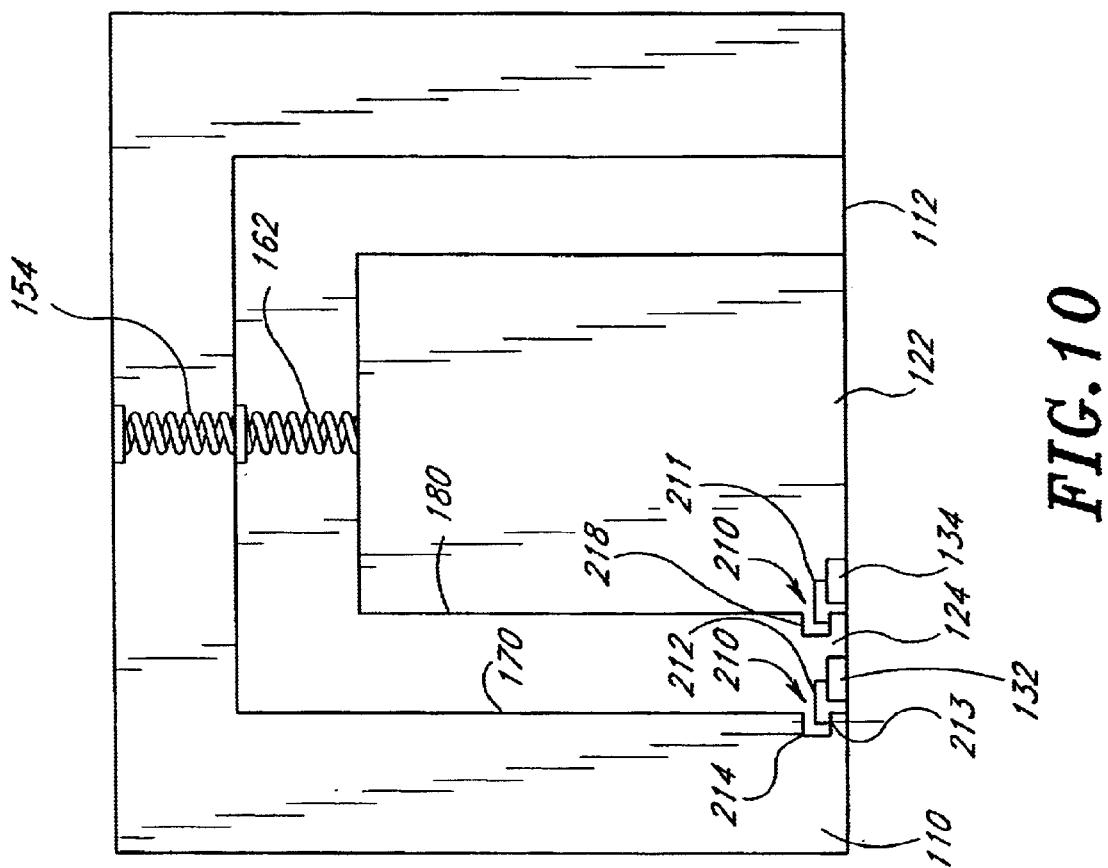
FIG. 10 is a simplified top cutaway view of the keyboard housing of the portable computer in FIG. 1 using an enlarged scale to illustrate a plurality of latch mechanisms that are used to secure the keyboard sections in place inside each respective housing.

FIG. 10 illustrates a plurality of latch mechanisms 210 used to deploy the second keyboard sections 112 from the first keyboard housing 110 and the third keyboard section 122 from the second keyboard housing 124. In one embodiment, the plurality of latch mechanisms 210 comprises a first hook member 212 resting inside a first cavity region 214 formed on a second inner surface 170 of the first keyboard housing 110.

The first hook member 212 is mounted on the second keyboard section 112 such that an outer edge 213 of the first hook member 212 faces the direction of the first cavity region 214 formed on the second inner surface 170. This allows the outer edge 213 of the first hook member to fit into the first cavity region 214, thereby securing the second keyboard section 112 in place.

The first hook member 212 is also connected in a well known manner to the first switch 132 so that when the user slides the first switch 132 in a substantially horizontal direction away from the first cavity region 214, the first hook member 212 will move in the same direction as the first switch 132, away from the first cavity region 214. In the illustrated embodiment as shown in FIG. 10, once the first hook member 212 is slid out of the first cavity region 214, it releases hold on the second keyboard section 112 and allows the first spring 154 to uncompress and push the second keyboard section 112 out from the first keyboard housing 110.

The first hook member 212, however, is spring biased in the direction towards the first cavity region 214, as such the natural position of the first hook member 212 is to be inside the first cavity region 214. Inside the first cavity region, the first hook member 212 is able to lock in place the second keyboard section 112 in a well known manner.

FIG. 10 further shows that the third keyboard section 122 is deployed from the second keyboard housing 124 using the identical latch mechanism 210 as described above in detail. A second hook member 211 is positioned into a second cavity region 218 placed in a well known manner on a second inner surface 180 of the second keyboard housing 124. The second switch 134 is connected in a well known manner to the second hook member 211 such that when the user slides the second switch 134 away from the direction of the second cavity region 218, the second hook member 211 is moved in the same direction.

Once the second hook member 211 moves away from the second cavity region 218, it releases the third keyboard section 122 and allows the second spring 162 to push the third keyboard section 122 out from the second keyboard housing 124. The keyboard deployment method using the above described latch mechanism does not require any electrical wiring and therefore substantially simplifies the design of keyboard assembly.

Figure 11:
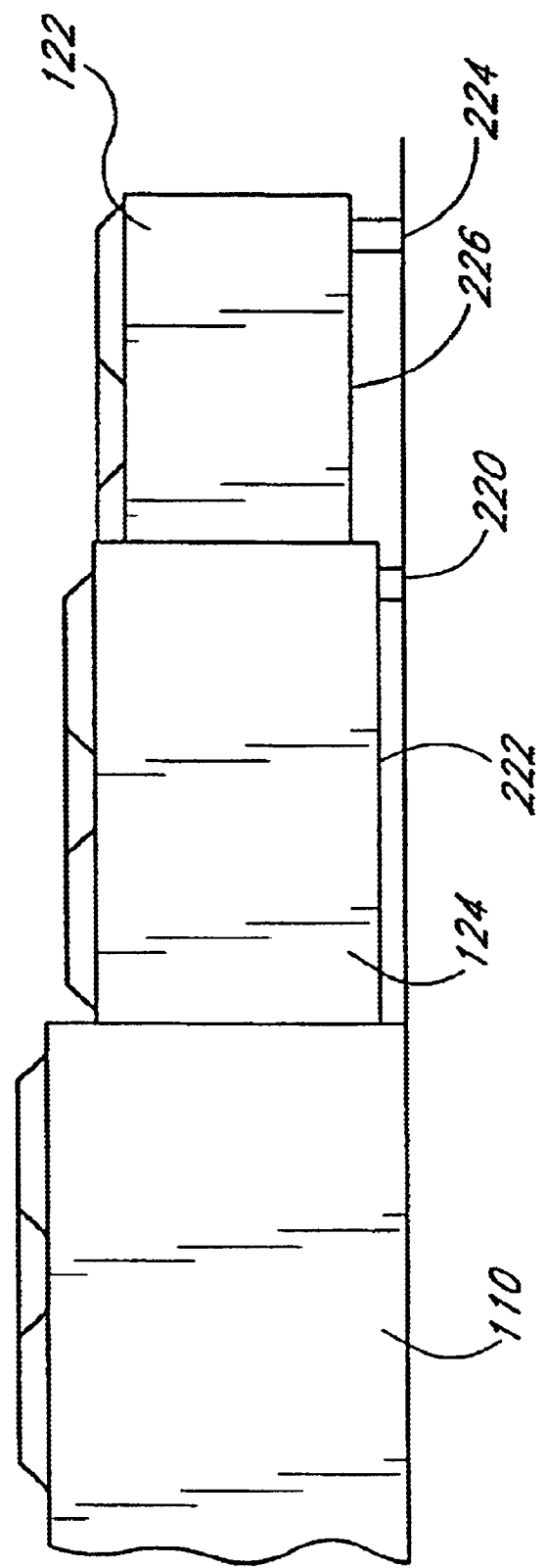
FIG. 11 is a simplified side view of one embodiment of a fully expanded keyboard wherein a plurality of drop-down legs are formed to support the expanded keyboard sections.

In another embodiment, as illustrated in FIG. 11, a plurality of leg members 220 is attached to a bottom surface 222 of the second keyboard housing 124. The plurality of leg members 220 is designed to drop down once the second keyboard section 112 is fully deployed so as to provide support to the second keyboard section 112 that is extended out from the first keyboard housing 110. In one embodiment, the plurality of leg members 220 are spring loaded so that they will drop down automatically once the second keyboard section 112 is fully deployed, while another embodiment requires the user to manually extend the plurality of leg members 220 by unfolding them once the second keyboard section 112 is outside the first keyboard housing 110. Another plurality of leg members 224 is similarly attached to a bottom surface 226 of the third keyboard section 122. The plurality of leg members 224 will also drop down via either an automatic spring loaded mechanism or manual extensions after the third keyboard section 122 is fully extended so as to provide support for the extended third keyboard section 122.

Hence, the disclosed embodiment provides a computer keyboard comprising an expandable keyboard wherein more than one sections of the keyboard can be stored in a nested manner inside a default keyboard. Furthermore, the stored keyboard sections comprise sets of frequently used keys arranged in a manner that is conducive to easy manipulation. The keyboard also provides users working in confined areas the option of not deploying the stored keyboard sections as the default keyboard alone is capable of fully operating the computer. When the stored keyboard sections are fully deployed, the keyboard comprises all the keys present on a standard keyboard and provides users a more user friendly layout where there is more room to manipulate the keys. The inventive process, therefore, provides additional keyboard sections to a computer without adding to the overall lateral dimension nor thickness of the computer.

This invention offers advantages of being able to provide portable computer users with a full keyboard layout that is typically afforded to larger keyboards of desk top computers. Additionally, this invention also gives portable computer users the choice of using a compressed keyboard representative of a typical portable computer keyboard or deploying additional sections of the keyboard so that the user receives the full benefit of a desk top computer.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A portable computer comprising:
   a housing having an opening formed in a first surface of the housing;
   a display attached to the housing;
   a first keyboard positioned on a second surface of the housing;
   a second keyboard movably mounted to the housing so that the second keyboard can be moved between a storage configuration and a deployed configuration, wherein the second keyboard in the stored configuration is recessed within the opening of the housing and wherein the second keyboard in the deployed configuration extends out of the opening so as to extend outward from the first surface of the housing; and
   a second keyboard housing having an opening in a first surface in the second keyboard housing.

2. The computer of claim 1, wherein the first keyboard is positioned on an upper surface of the housing and wherein the opening in the housing is positioned on a side surface of the housing so that the second keyboard extends outward from the side surface.

3. The computer of claim 1, wherein the first keyboard comprises a QWERTY keyboard.

4. The computer of claim 3, wherein the second keyboard comprises a movement keyboard.

5. The computer of claim 1, further comprising a third keyboard that is movably mounted to the second keyboard housing so as to be movable between a storage configuration and a deployed configuration wherein the third keyboard in the storage configuration is stored within the second keyboard housing and wherein the third keyboard in the deployed configuration extends out from the first surface of the second keyboard housing.

6. The computer of claim 5, wherein the second and third keyboards are respectively mounted so that when the second and the third keyboards are respectively in the storage configuration, an outer surface of the third keyboard and the outer surface of the second keyboard are co-planar with the first surface of the housing.

7. A portable computer comprising:
   a housing having an opening formed in a first surface of the housing;
   a display attached to the housing;
   a first keyboard positioned on a second surface of the housing;
   a second keyboard movably mounted to the housing so that the second keyboard can be moved between a storage configuration and a deployed configuration, wherein the second keyboard in the stored configuration is recessed within the opening of the housing and wherein the second keyboard in the deployed configuration extends out of the opening so as to extend outward from the first surface of the housing; and
   a latch mechanism which secures the second keyboard in place when the second keyboard is in the stored configuration inside the housing.

8. The computer of claim 7, wherein the latch mechanism comprises a hook member positioned inside a cavity region formed on a first inner surface of the housing.

9. The computer of claim 5, wherein the second keyboard comprises cursor keys.

10. The computer of claim 5, wherein the third key board comprises numeric keys arranged in a 10-key configuration.

11. The computer of claim 7, wherein a plurality of drop-down leg members are formed on a bottom surface of the second keyboard so as to support the second keyboard when it is in a deployed configuration.

12. The computer of claim 7, wherein the first keyboard is operable when the second keyboard is in a stored configuration inside the housing.

13. A computer keyboard assembly comprising:
- at least one keyboard member that is expandable wherein at least one keyboard section is housed in a nested fashion within the at least one keyboard member and is secured within the at least one keyboard member by a latch member such that the at least one keyboard section telescopes out when the latch member is released.

14. The computer keyboard assembly of claim 13 further comprises a plurality of drop-down leg members formed on a bottom surface of the at least one keyboard section to support the at least one keyboard section when it is telescoped out from the at least one keyboard member.

15. The computer keyboard assembly of claim 13 wherein a first keyboard section remains operable when at least one other keyboard section is stored inside at least one keyboard housing.

16. The computer keyboard assembly of claim 13 wherein the at least one keyboard member comprises a QWERTY keyboard.

17. The computer keyboard assembly of claim 13 wherein the at least one keyboard section comprises cursor keys.

18. The computer keyboard assembly of claim 13 wherein the at least one keyboard section comprises numeric keys arranged in a 10-key configuration.

19. A computer keyboard comprising:
- a keyboard housing having an opening formed in a first surface of the housing;
- a first keyboard positioned on a second surface of the keyboard housing; and
- a second keyboard section and a third keyboard section wherein the second keyboard section and the third keyboard section can be retracted back into the opening of the keyboard housing so as to reduce the keyboard's overall lateral dimension without increasing its thickness.

20. The keyboard in claim 19, wherein the first keyboard comprises a QWERTY keyboard.

21. A computer keyboard comprising:
- a keyboard housing having an opening formed in a first surface of the housing;
- a first keyboard positioned on a second surface of the keyboard housing;
- at least one keyboard section wherein the at least one keyboard section can be moved back into the opening of the keyboard housing so as to reduce the keyboard's overall lateral dimension without increasing its thickness; and
- at least one latch mechanism which secures the at least one keyboard section inside the keyboard housing.

22. The keyboard in claim 21, wherein the first keyboard can operate the computer while the at least one keyboard section is stored within the housing.

23. A method of operating a computer comprising:
- operating a first keyboard formed on a first surface of a first housing;
- deploying a second housing from an opening formed on a second surface of the first housing;
- operating a second keyboard formed on a first surface of the second housing; and
- deploying a third housing from an opening formed on a second surface of the second housing and operating a third keyboard formed on a first surface of the third housing.

24. The method of claim 23 wherein the first keyboard comprises a QWERTY keyboard.

25. The method of claim 23 wherein the second keyboard comprises a movement keyboard.

26. The method of claim 23 wherein the third keyboard comprises numeric keys arranged in a 10-key configuration.

27. A method of operating a computer comprising:
- operating a first keyboard formed on a first surface of a first housing;
- disengaging a latch mechanism to enable deployment of a second housing from an opening formed on a second surface of the first housing;
- deploying the second housing from the opening formed on the second surface of the first housing; and
- operating a second keyboard formed on a first surface of the second housing.

28. The method of claim 23 further comprises storing the second housing inside the first housing in a manner such that the second keyboard is inside the first housing and concealed from view.

* * * * *